US012694901B1

(12) United States Patent
Tammela et al.

(10) Patent No.: US 12,694,901 B1
(45) Date of Patent: Jul. 28, 2026

(54) READING VOXELS IN AN OPTICAL STORAGE MEDIUM USING OFF-AXIS LIGHTING

(71) Applicant: Microsoft Technology Licensing, LLC, Redmond, WA (US)

(72) Inventors: Simo Kaarlo Tapani Tammela, Espoo (FI); Anton Viljami Autere, Järvenpää (FI); Esa Tapani Räikkönen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/097,036

(22) Filed: Apr. 1, 2025

(51) Int. Cl.
| | |
|---|---|
| *G11B 7/00* | (2006.01) |
| *G11B 7/09* | (2006.01) |
| *G11B 7/127* | (2012.01) |
| *G11B 7/128* | (2012.01) |
| *G11B 7/1374* | (2012.01) |
| *G11B 7/1376* | (2012.01) |

(52) U.S. Cl.
CPC .......... *G11B 7/0946* (2013.01); *G11B 7/0938* (2013.01); *G11B 7/127* (2013.01); *G11B 7/128* (2013.01); *G11B 7/1374* (2013.01); *G11B 7/1376* (2013.01)

(58) Field of Classification Search
CPC ........ G11B 7/0065; G11B 2007/00653; G11B 2007/00656; G11B 2220/2504; H04N 5/89

USPC .......................................................... 369/103
See application file for complete search history.

(56) References Cited

U.S. PATENT DOCUMENTS

| | | | | | |
|---|---|---|---|---|---|
| 6,366,368 | B1 * | 4/2002 | Horimai | ............... | G03H 1/0808 |
| | | | | | 359/9 |
| 7,321,540 | B2 * | 1/2008 | Goulanian | ........... | G11B 7/0065 |
| 7,841,529 | B2 * | 11/2010 | Elyasaf | .............. | G01N 21/9501 |
| | | | | | 382/141 |
| 11,341,620 | B2 * | 5/2022 | Gomez Diaz | ............. | G06T 5/70 |

* cited by examiner

*Primary Examiner* — Nabil Z Hindi
(74) *Attorney, Agent, or Firm* — Michael T. Abramson; Jordan IP Law, LLC

(57) ABSTRACT

An off-axis lighting system for optical storage media comprises a Gaussian laser illumination source and illumination optics including collimating and cylindrical lenses. The system generates an illumination beam that propagates through the optical storage medium at angles different from the optical axis of a line scanning camera system. A collimating lens shapes the beam, adjusting characteristics such as beam waist diameter and location. A cylindrical lens further shapes the beam, creating an elliptical two-dimensional profile across its cross-section. The combination of off-axis propagation and elliptical profile restricts illumination to the voxels in the field of view of the line scanning camera at a specific layer in the optical storage medium. The off-axis lighting system enhances an ability of an optical read system to read voxels by improving the signal-to-noise ratio (SNR) of the voxel images captured by the line scanning camera used to decode symbols stored by the voxels.

19 Claims, 16 Drawing Sheets

300

350

Read system with alternative optical storage media type

Line scanning camera system — 360

Optical storage medium

100

Off-axis lighting system

355

350

Read system

Line scanning camera system — 360

Optical storage medium

100

Off-axis lighting system

Figure 6:
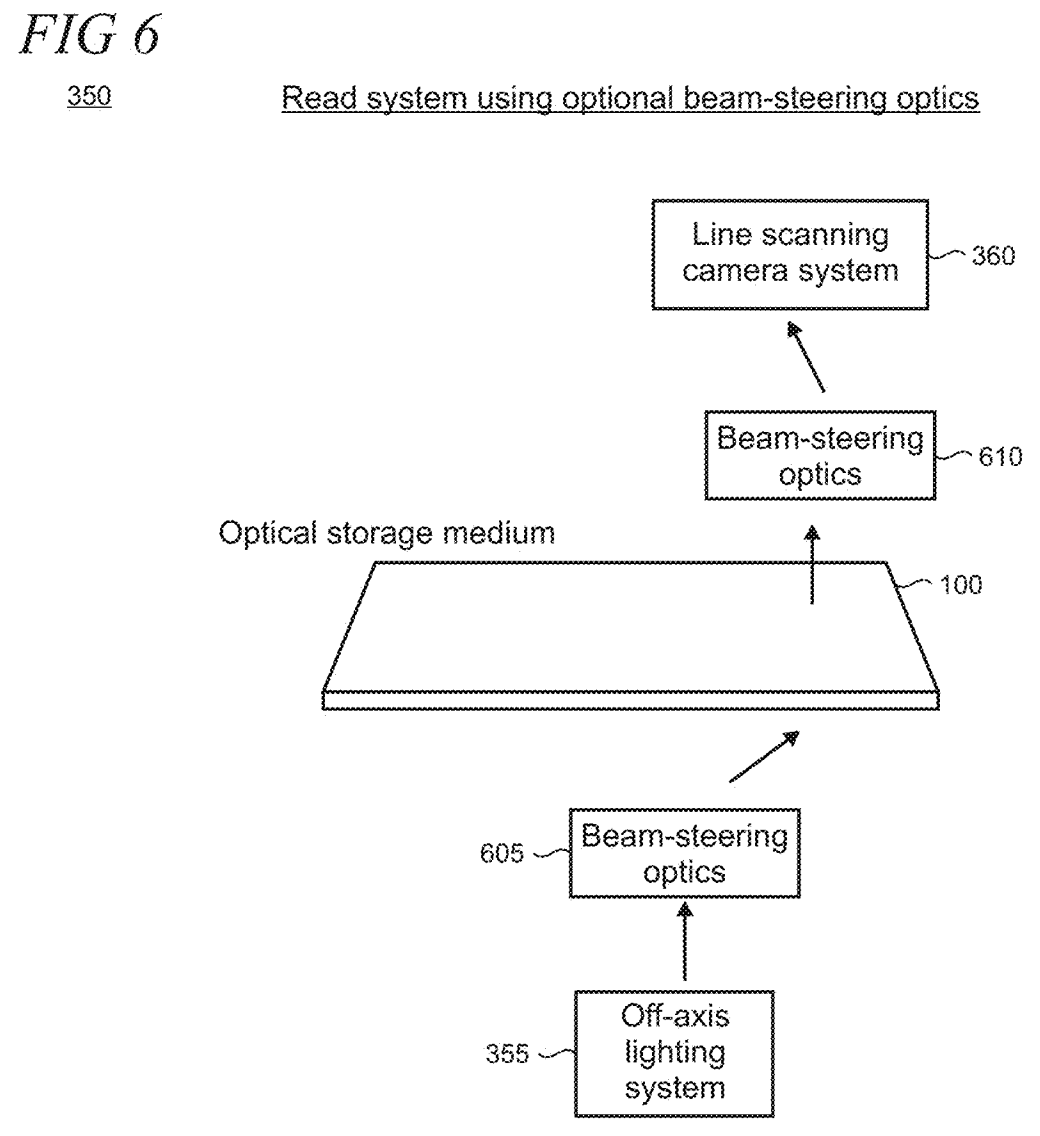

Read system using optional beam-steering optics

Line scanning camera system ~360

Beam-steering optics ~610

Optical storage medium ~100

Beam-steering optics ~605

Off-axis lighting system ~355

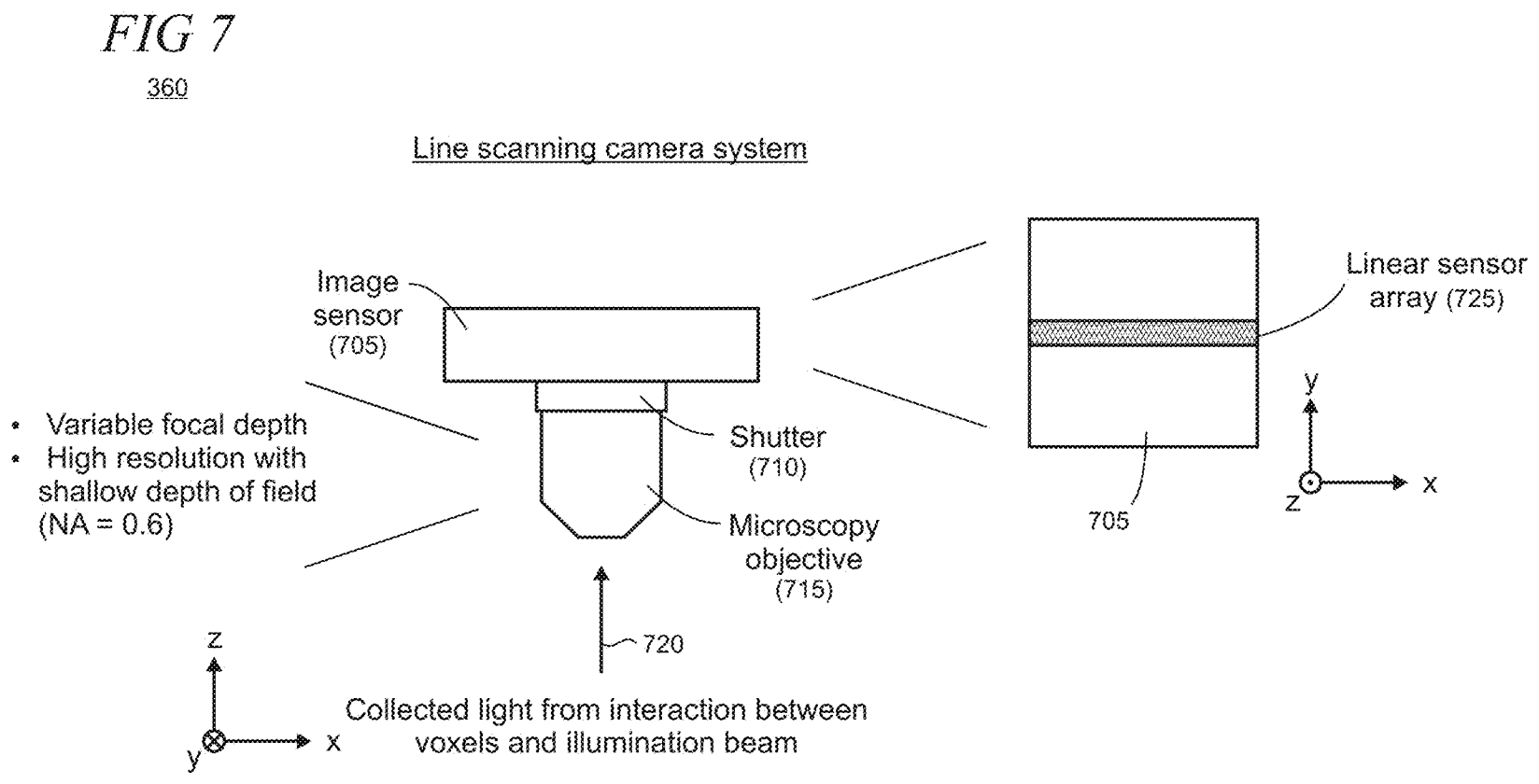

*FIG 7*
360

Line scanning camera system

Linear sensor array (725)

705

Image sensor (705)

Shutter (710)

Microscopy objective (715)

720

Collected light from interaction between voxels and illumination beam

• Variable focal depth
• High resolution with shallow depth of field (NA = 0.6)

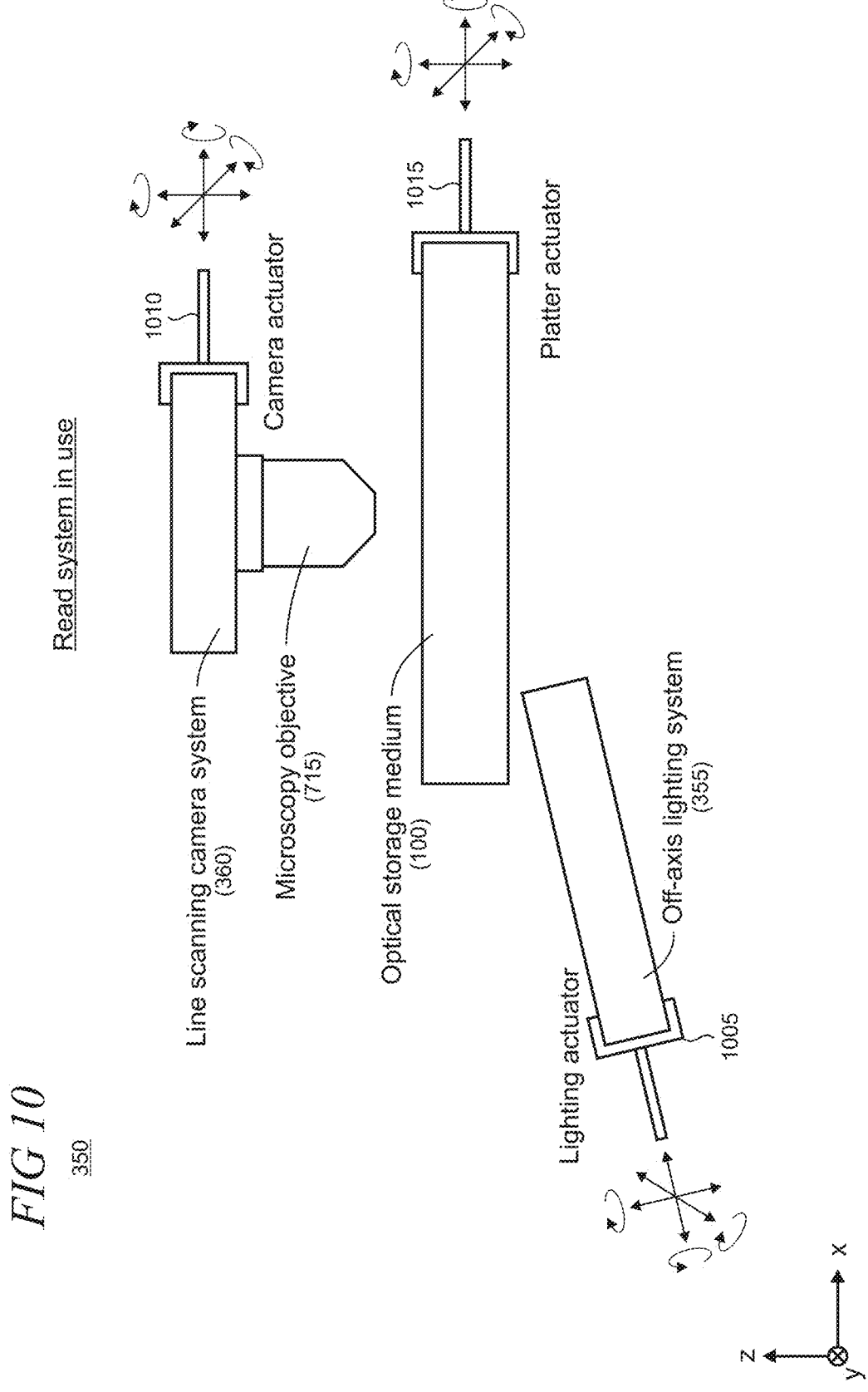

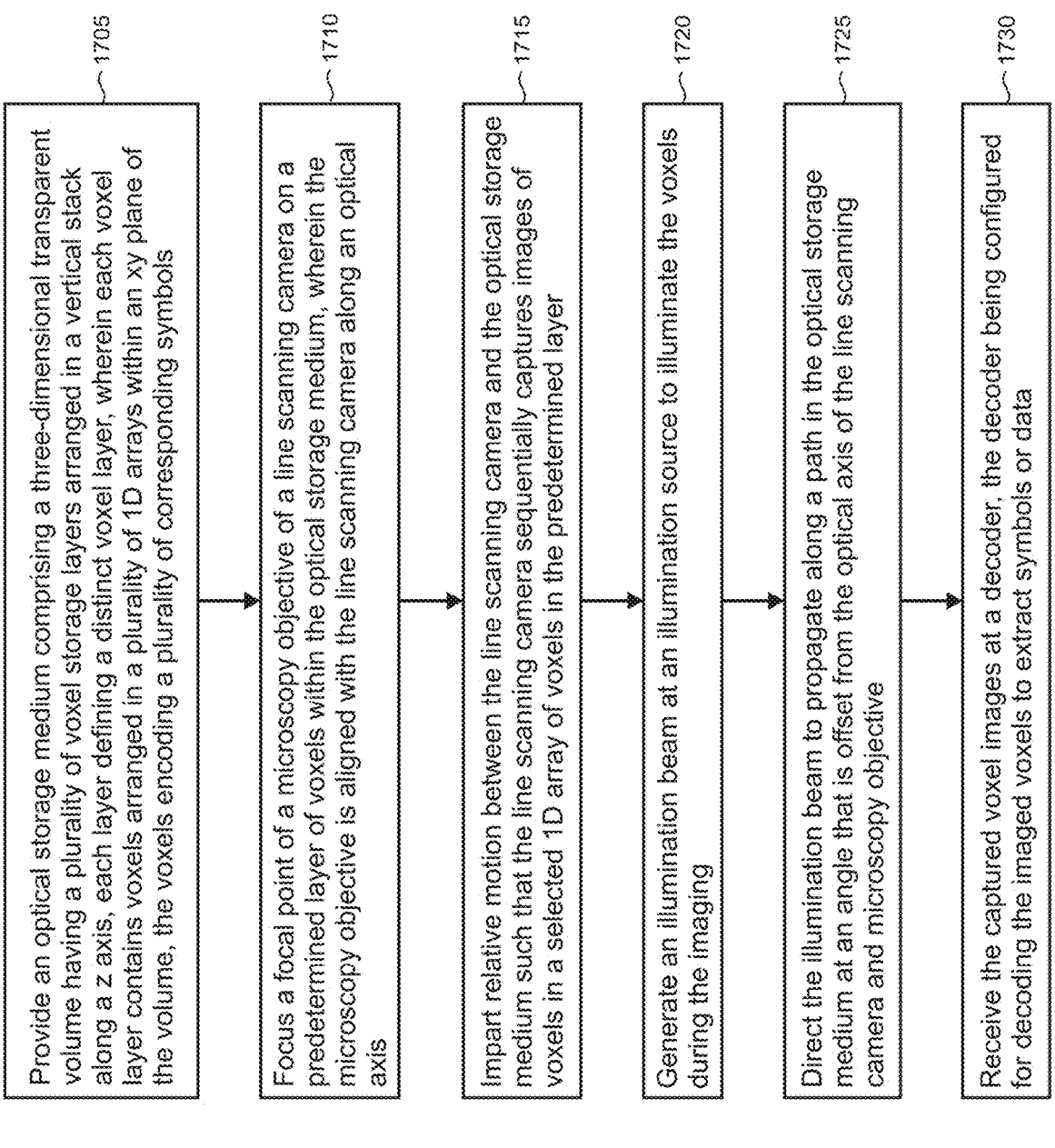

Provide an optical storage medium comprising a three-dimensional transparent volume having a plurality of voxel storage layers arranged in a vertical stack along a z axis, each layer defining a distinct voxel layer, wherein each voxel layer contains voxels arranged in a plurality of 1D arrays within an xy plane of the volume, the voxels encoding a plurality of corresponding symbols — 1705

Focus a focal point of a microscopy objective of a line scanning camera on a predetermined layer of voxels within the optical storage medium, wherein the microscopy objective is aligned with the line scanning camera along an optical axis — 1710

Impart relative motion between the line scanning camera and the optical storage medium such that the line scanning camera sequentially captures images of voxels in a selected 1D array of voxels in the predetermined layer — 1715

Generate an illumination beam at an illumination source to illuminate the voxels during the imaging — 1720

Direct the illumination beam to propagate along a path in the optical storage medium at an angle that is offset from the optical axis of the line scanning camera and microscopy objective — 1725

Receive the captured voxel images at a decoder, the decoder being configured for decoding the imaged voxels to extract symbols or data — 1730

1800

1

READING VOXELS IN AN OPTICAL STORAGE MEDIUM USING OFF-AXIS LIGHTING

BACKGROUND

Mass storage of digital data relies on conversion of the data into a persistent, physical perturbation, or state change, within a data-storage medium. Conversely, retrieving previously stored data from a data-storage medium requires probing the medium to detect the perturbations which can cause localized changes in the optical properties of a medium. Image-based processes to retrieve data may be subject to interference and crosstalk which lowers the signal-to-noise ratio (SNR) and potentially alters the observations, leading to misinterpretation of data.

SUMMARY

Disclosed are a method, an optical read system, and an optical read drive for optically reading data, stored in voxels written into a transparent three-dimensional (3D) optical storage medium in multiple layers, using an off-axis lighting system that illuminates voxels of interest for imaging by a camera system. The camera system has an optical axis that projects into the optical storage medium. The lighting system provides an illumination beam that propagates in the optical storage medium at an angle that is different (i.e., is off-axis) from the optical axis of the camera system.

In illustrative embodiments, the camera system comprises a line scanning camera having a relatively narrow field of view (FOV) that is aligned during reading along a one-dimensional (1D) array of pixels in a selected layer of the optical storage medium. The illumination beam from the lighting system selectively illuminates the voxels in the selected layer for imaging using microscopy. Illumination of non-imaged voxels in other layers is limited by the off-axis propagation path of the beam in the optical storage medium.

A microscopy objective is arranged to focus on the selected layer of voxels to enable illumination light scattered from interactions with voxels within the FOV of the line scanning camera to be collected in images. The imagers are analyzed to read the voxels based on voxel characteristics including, for example, strength of the light scattering and voxel size. Relative motion between the optical storage medium and line scanning camera enables voxels in the 1D array to be sequentially imaged. Captured images of voxels are interpreted using a decoder and machine-learning-based post processing to extract values for symbols stored in the voxels. In an illustrative embodiment, the microscopy objective is configured with an adjustable depth of focus to enable controllable focus of the line scanning camera on a selected layer of voxels in the optical storage medium.

Illumination optics comprising collimation and cylindrical lenses are utilized to shape characteristics of the illumination beam including cross-sectional profile and beam waist size and location. An elliptically shaped cross-section is provided to the illumination beam which enters the optical storage medium at an oblique angle to the bottom surface of the medium. The elliptical cross-section of the propagating illumination beam is aligned with the narrow FOV of the line scanning camera system. Such alignment reduces the collection of unwanted scattered light from voxels in adjacent rows in the layer. Alternatively, rather than use a cylindrical lens to shape the beam profile into an elliptical cross-section, a scanning technique is utilized to suitably guide the laser beam to generate a line of light to illuminate the voxels of interest.

In other illustrative embodiments, light exposure to an image sensor in the camera is controlled, for example, using a camera shutter or by modulating the illumination source in the off-axis lighting system. Actuators are provided to impart relative motion among components in the optical read drive including the camera system, off-axis lighting system, and optical storage medium. The camera system and actuators are coupled to a read controller to enable the movement of the optical storage medium, relative to the camera system, to be synchronized with the light exposure at the image sensor during read operations.

The elliptical profile and off-axis propagation path of the illumination provided by the off-axis lighting system enhances optical reading of voxels by reducing the collection of stray light from non-imaged adjacent voxels in the layer or from voxels in neighboring layers. The narrow FOV of the line scanning camera system further complements the elliptical profile and off-axis propagation of the illumination beam to improve the signal-to-noise ratio (SNR) of the imaged voxels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 6 shows an illustrative optical data read system using off-axis lighting that is arranged with optional beam-steering components;

FIG. 7 shows components of an illustrative line scanning camera system;

FIG. 10 shows an illustrative optical data read system using off-axis lighting as configured for use with actuators to enable relative motion among components;

3

Figure 13:
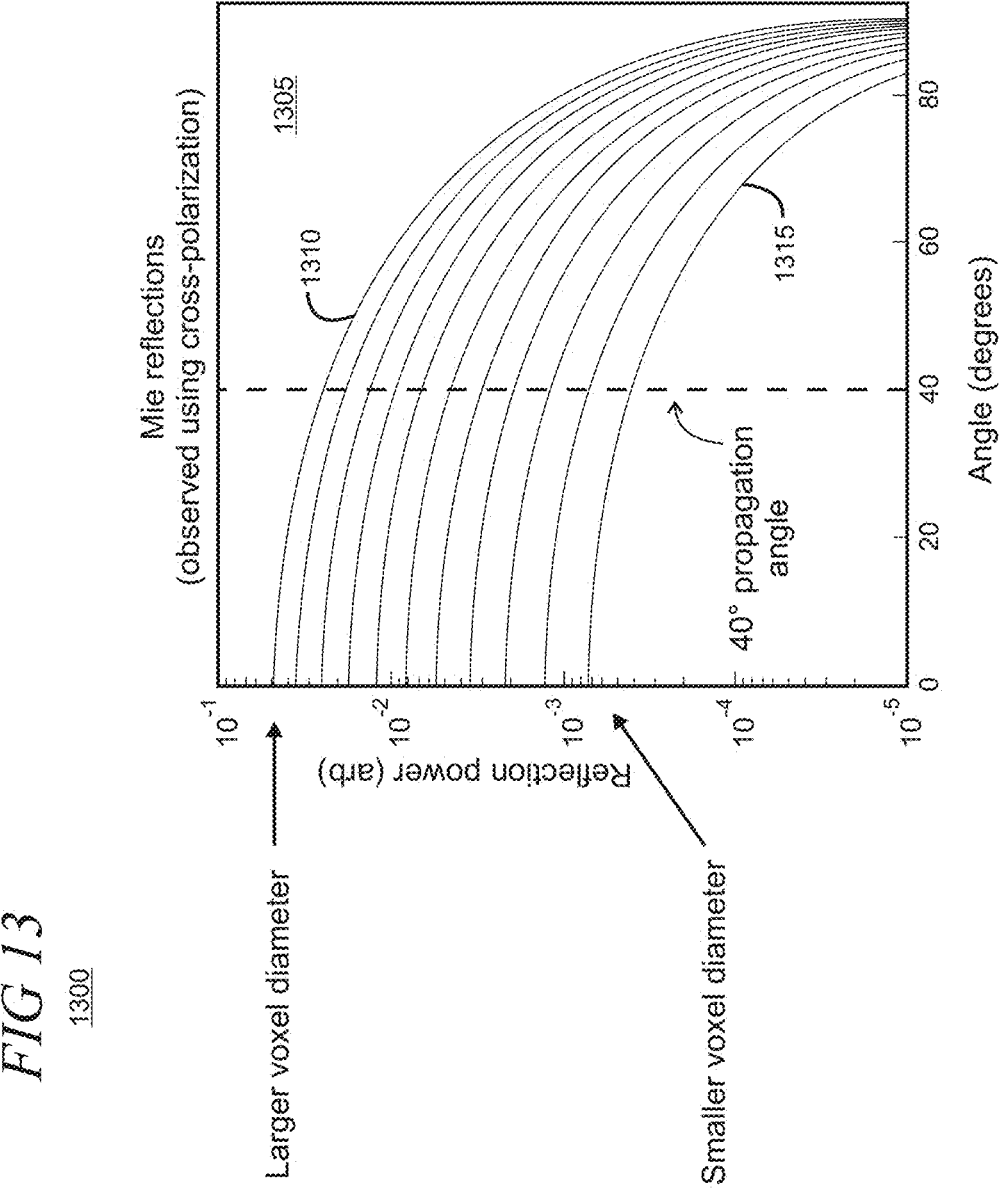
Figure 14:
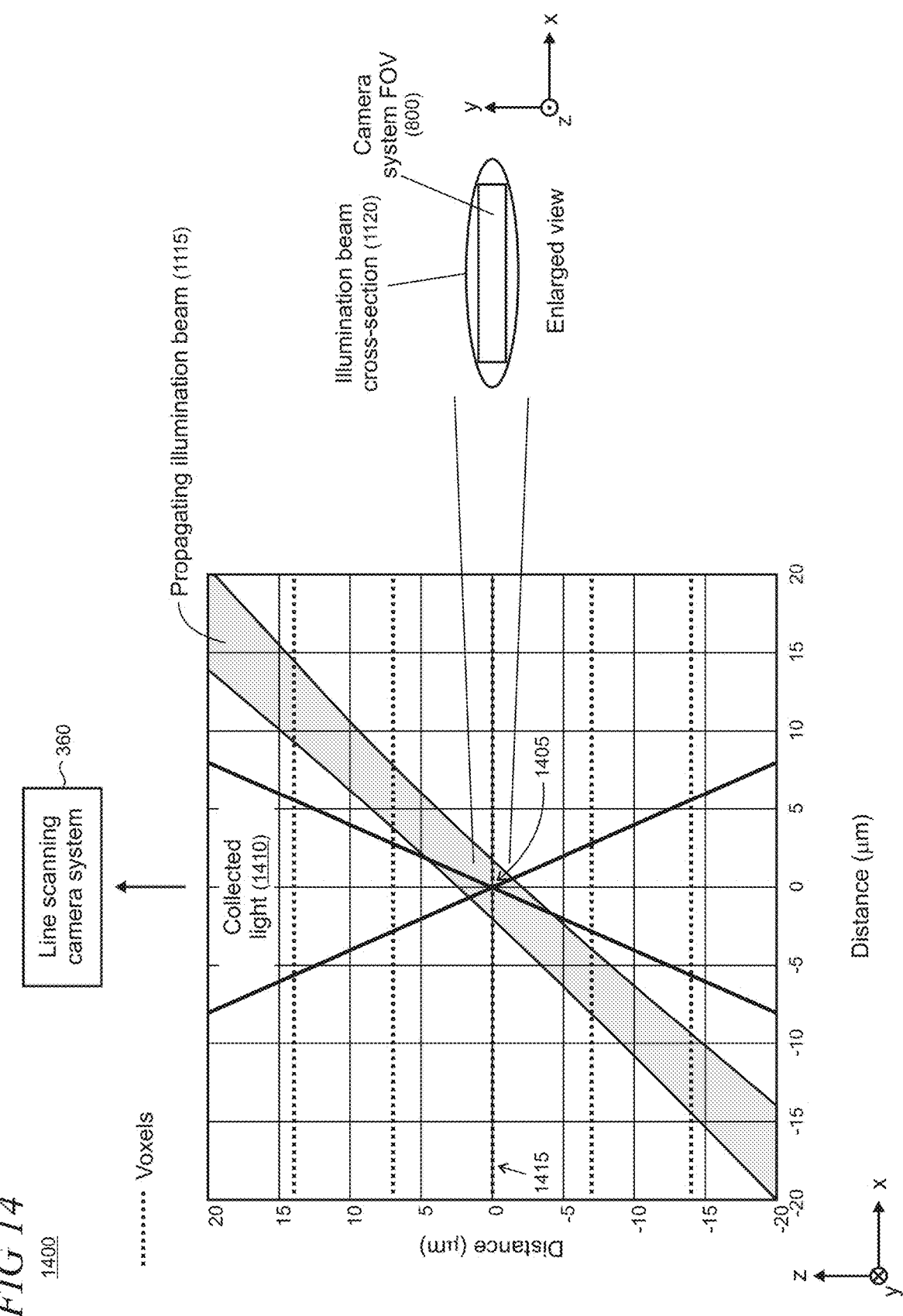
Figure 15:
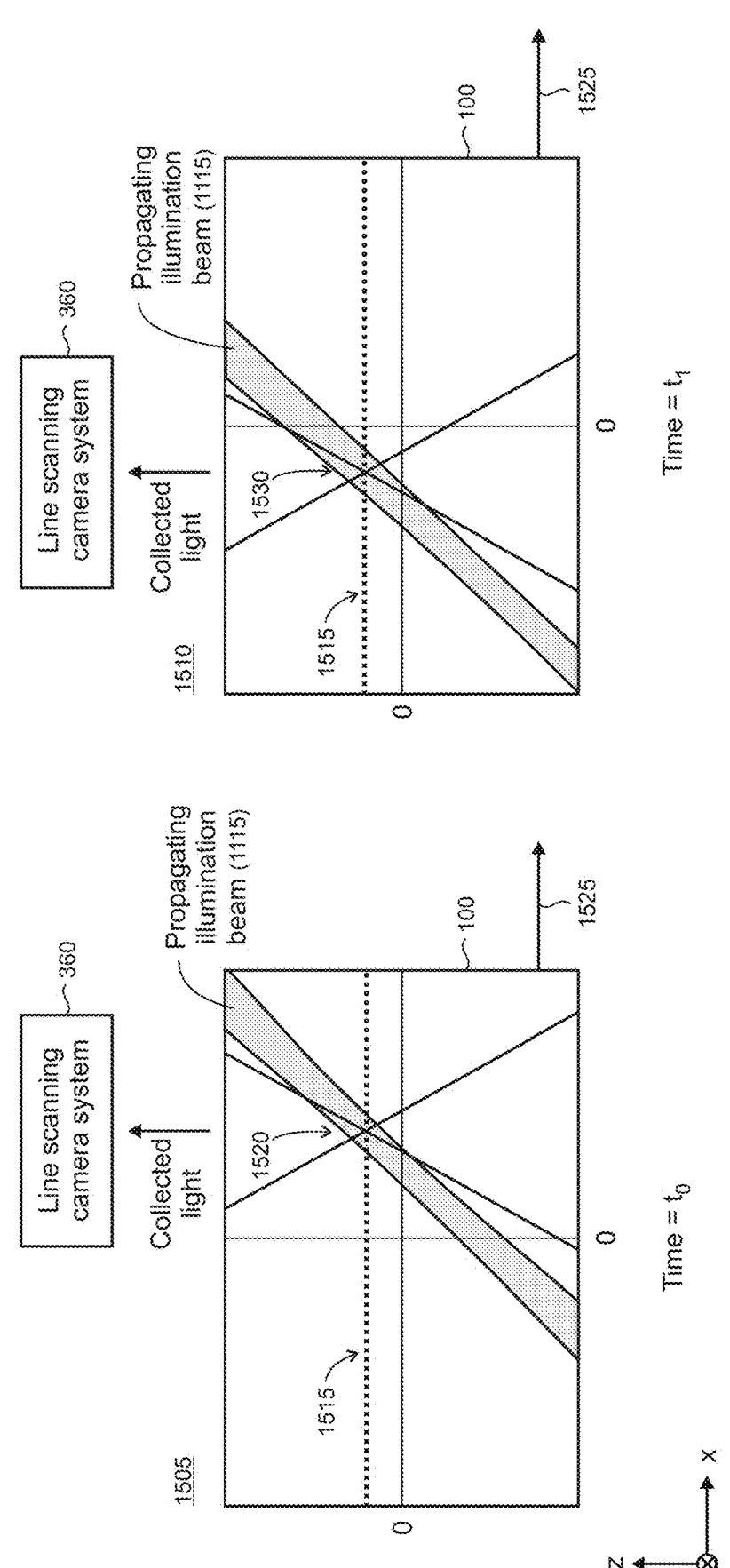
Figure 16:
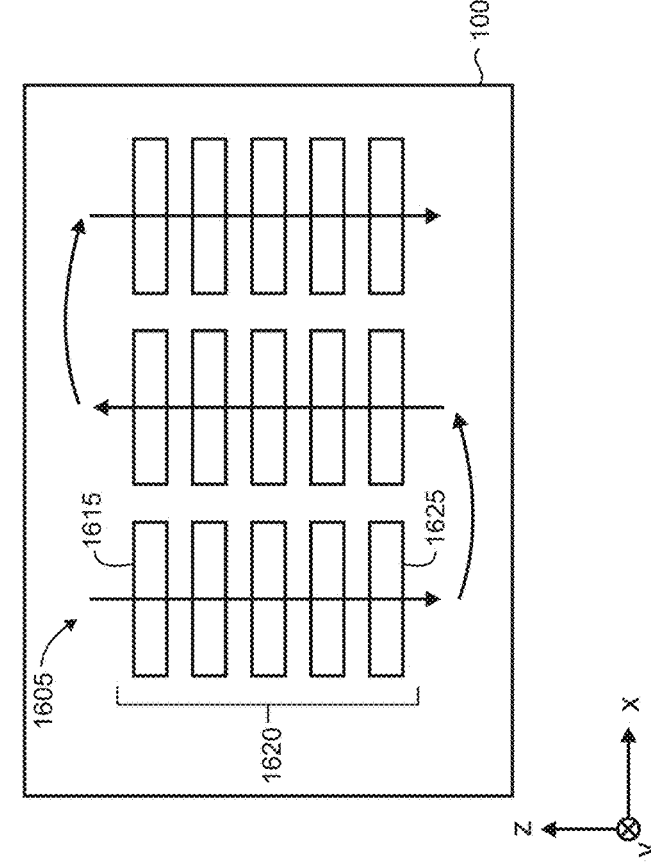
Figure 18:
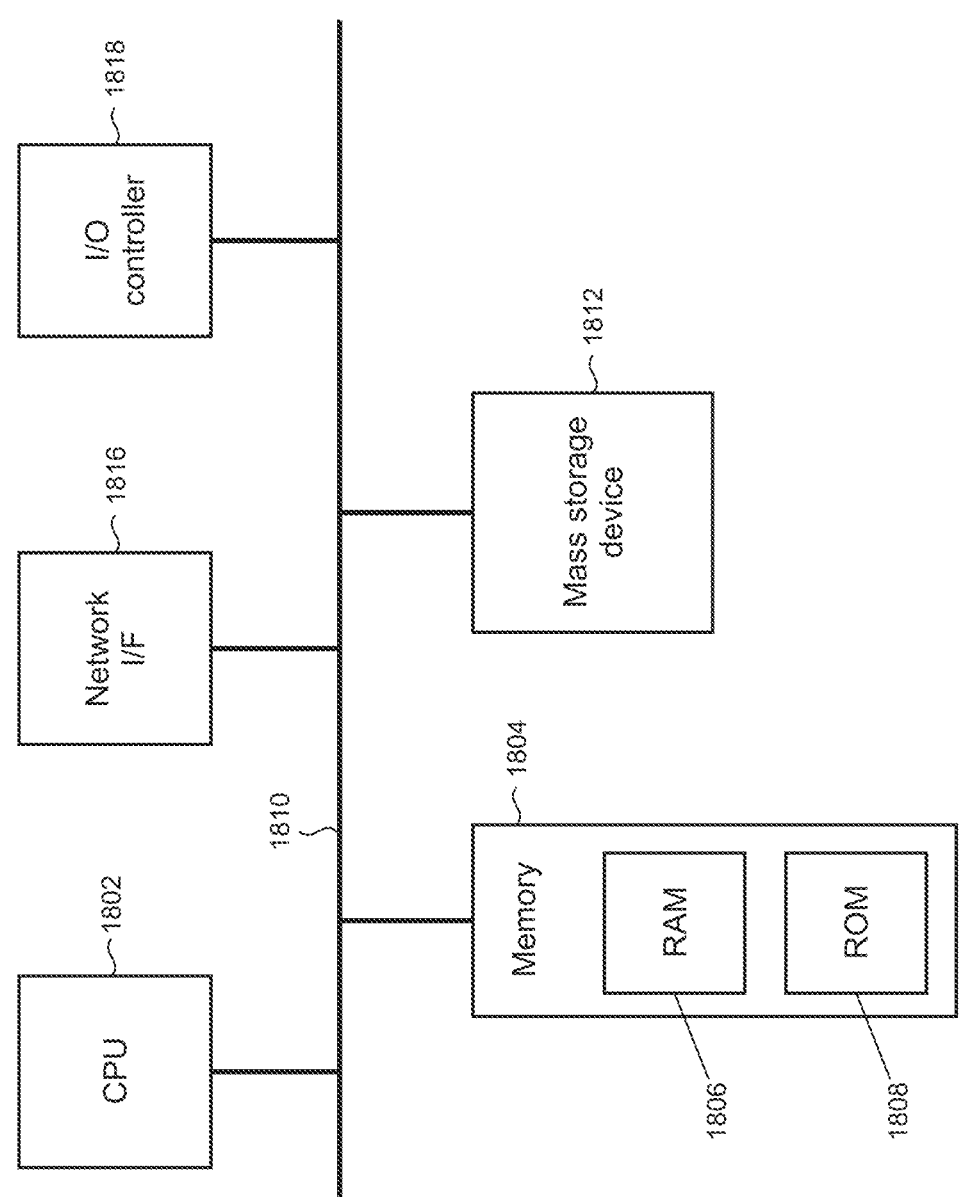

FIG. 13 shows Mie scattering observed using cross polarization as a function of the angle of the illumination light propagating in an optical storage medium for different voxel diameters;

FIG. 14 is an illustrative cross-sectional view of an optical storage medium showing an intersection of a propagating illumination beam and a focal point for light collected by a line scanning camera system;

FIG. 15 provides illustrative cross-sectional views of an optical storage medium showing how voxels can be illuminated and imaged at different locations within the volume of the medium;

FIG. 16 shows a comparison of a conventional reading pattern for an optical storage medium and a reading pattern for an optical storage medium used by a read system with off-axis lighting;

FIG. 17 is a flowchart of an illustrative method for optically reading data that is facilitated using the present principles; and FIG. 18 is a simplified block diagram of an illustrative computing device that may be used, at least in part, to implement aspects of the present reading of voxels in an optical storage medium using off-axis lighting.

Like reference numerals indicate like elements in the drawings. Elements are not drawn to scale.

DETAILED DESCRIPTION

Demand for archival storage for high-value, long-lived data continues to grow exponentially. Cloud archival storage providers utilize statistical multiplexing of many customers' workloads onto a shared storage platform to offer the lowest storage cost. Today, in all large-scale cloud providers, the most cost-effective media is magnetic, usually combining hard disk drives (HDDs) and tape. All magnetic media have limited lifetimes, and the data on it degrades over time, thus the data needs to be migrated. In particular, HDDs have about a 5-year lifetime and tape has about a 10-year lifetime. Since bit rot occurs in both magnetic media types over time, storage systems use scrubbing to guarantee data integrity. In addition, both have significant media costs, requiring garbage collection and defragmentation over time. As a result, while it may be intuitive to assume that data storage costs are a function of the customer access rates, for most archival workloads, the background management accesses associated with the refresh cycle, data integrity checking, and garbage collection dominate user accesses. Hence, these background management accesses also dominate the costs associated with storing data. Since most archival data is rarely accessed, the environmental and financial costs of storing archival data on magnetic media increase over time.

Archival storage systems designed using glass storage media are providing a clean-slate approach to service modern cloud archival workloads sustainably, reliably, and efficiently. Using glass provides extremely low-cost Write-Once-Read-Many (WORM) media with no bit rot over more than 1000 years. This latter property means that the media removes the need for integrity checking, minimizing energy usage over time. Since the media is low-cost, it also removes the need to perform active garbage collection. Finally, the design of the storage system around glass media removes the need for the refresh cycle, allowing data to be left in situ, and dramatically reducing the carbon footprint of long-lived data.

A voxel is a light-scattering nanostructure located in a transparent optical storage medium. Using femtosecond laser pulses, a plurality of voxels written into a durable low-cost glass optical storage medium as arrays in an xy plane of the medium in multiple layers along a z axis to store symbols for differentially encoded data. The optical storage medium is utilized, for example, in WORM applications for mass data storage.

The light scattering properties enable multiple bits to be encoded per voxel to represent multiple symbols. Microscopy is used to image voxels of interest in an xy plane in the optical storage medium to capture illumination light scattered from the voxels at a light-sensitive image sensor of a line scanning camera system. The amount of scattered light detected by the image sensor determines the voxel strength which, in combination with voxel size and/or 3D positioning within the optical storage volume, in some cases, enables data stored in the optical storage volume to be read by a read system. A decoder is utilized to decode and extract the encoded symbols from the image data captured by the line scanning camera system. Additional post-processing including machine learning is utilized in some implementations to provide increased accuracy in converting the image data into digital data.

The line scanning camera system includes the image sensor and a variable-focus microscopy objective utilized to focus at different depths to read voxels in different layers of the optical storage medium. The line scanning camera system is configured with a narrow field of view (FOV) using, for example, a linear sensor array and/or specialized optics. Voxels in a layer of the optical storage medium can be arranged as a plurality of one-dimensional (1D) arrays. A major axis of the FOV of the line scanning camera system is aligned with voxels in a given 1D array for imaging using microscopy. The use of the narrow FOV reduces inter-symbol interference from adjacent voxels in the layer to increase SNR and improves voxel read accuracy of the read system.

The off-axis lighting system comprises the laser illumination source and illumination optics including collimating and cylindrical lenses. The lighting system is considered off-axis because the generated illumination beam is introduced to, and propagates in, the optical storage medium at angles that are different from an optical axis of the line scanning camera system. The collimating lens provides beam shaping for the illumination to adjust characteristics such as beam waist diameter and beam waist location along its propagation path in the optical storage medium. The cylindrical lens provides additional beam shaping to distribute the laser's energy in an elliptical two-dimensional profile across the illumination beam's cross-section. The off-axis propagation and elliptical profile of the illumination beam isolate illumination to voxels in the FOV of the line scanning camera at a specific layer. The isolation further improves SNR by reducing the collection of light scattered by the non-imaged voxels from neighboring layers as crosstalk.

An alternative approach to the cylindrical lens uses a scanning system that generates a bright line of laser light to illuminate the voxels in the FOV of the line scanning camera at a specific layer of the optical storage medium. Such scanning systems include, but are not limited to, MEMS (micro electromechanical system) scanners with moveable mirrors, polygon scanners with rotating mirrors, galvanometer scanners with rotating mirrors, piezo scanners, resonant optical scanners, and other suitable scanner types and devices that can guide or steer illumination light to illuminate voxels of interest. For example, the collimated illumination beam is directed onto a scanning mirror, or other suitable component, which rapidly oscillates to deflect the beam at high frequencies. As the mirror moves, it sweeps the laser beam across a surface or through space, creating a line of laser light.

Reading voxels in an optical storage medium using off-axis lighting is advantageously robust against signal impairments from light scattering from non-imaged voxels (i.e., adjacent voxels and voxels in other layers) such as inter-symbol interference and crosstalk.

Figure 1:
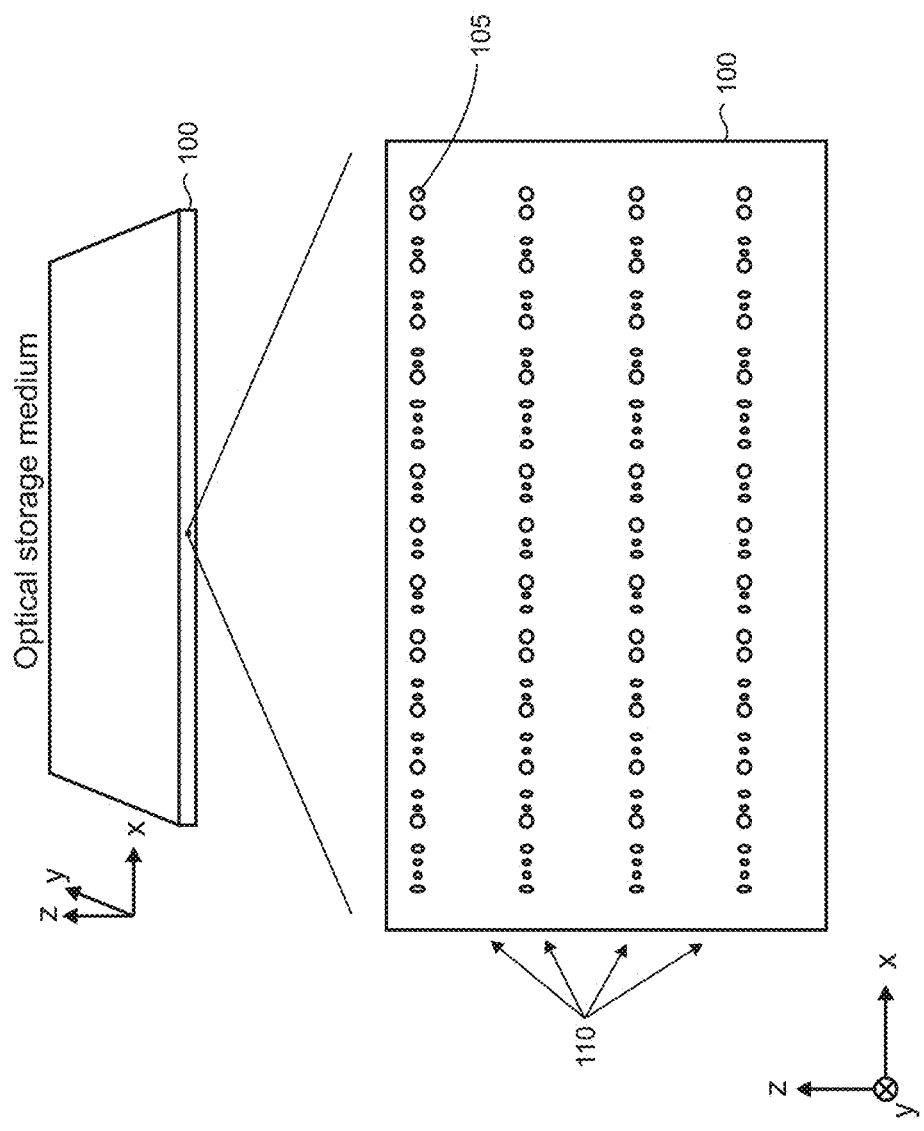
FIG. 1 shows an illustrative optical storage medium that includes a plurality of voxels arranged in a three-dimensional array.

Turning now to the drawings, FIG. 1 shows an illustrative optical storage medium 100 that includes a plurality of voxels, representatively indicated by reference numeral 105, that are arranged in a three-dimensional array. It is noted that directional terms such as "top", "bottom", "left", "right", "above", "below", "horizontal" and "vertical" are used herein for convenience of description. The "top" and "bottom" of an optical data storage medium are taken to be the faces which are parallel to the layers of voxels. For the avoidance of any doubt, this terminology is not intended to limit orientation in an external frame of reference.

The optical storage medium is commonly referred to as a "platter" in the optical storage art. The substrate for the optical storage medium is transparent and typically takes the form of bulk glass including borosilicate or fused silica (i.e., quartz) glasses. Alternatively, the substrate may comprise polymers. The substrate may be formed using a relatively thin optical layer that is coupled to a mechanically stable supporting layer in some applications. Glass is typically an ideal medium for archival storage because it has three suitable properties: (i) it is low-cost; (ii) it is chemically inert and therefore durable and resilient to the environment (e.g., temperature, moisture, and electromagnetic interference); and (iii) the structures used to store data have lifetimes of over a thousand years.

The voxels 105 are light-scattering nanostructures that are embedded in the optical storage medium 100. The voxels are typically written in layers 110 to encode digital data that is read optically, as described below. Within each layer, voxels are grouped into planar arrays, typically as two-dimensional (2D) arrays or groups of one-dimensional (1D) arrays. Data is stored in the glass by making permanent physical modifications within the volume of the optical storage medium which are not susceptible to bit rot or corruption. Therefore, glass is sustainable and provides a cost-effective WORM medium.

Figure 2:
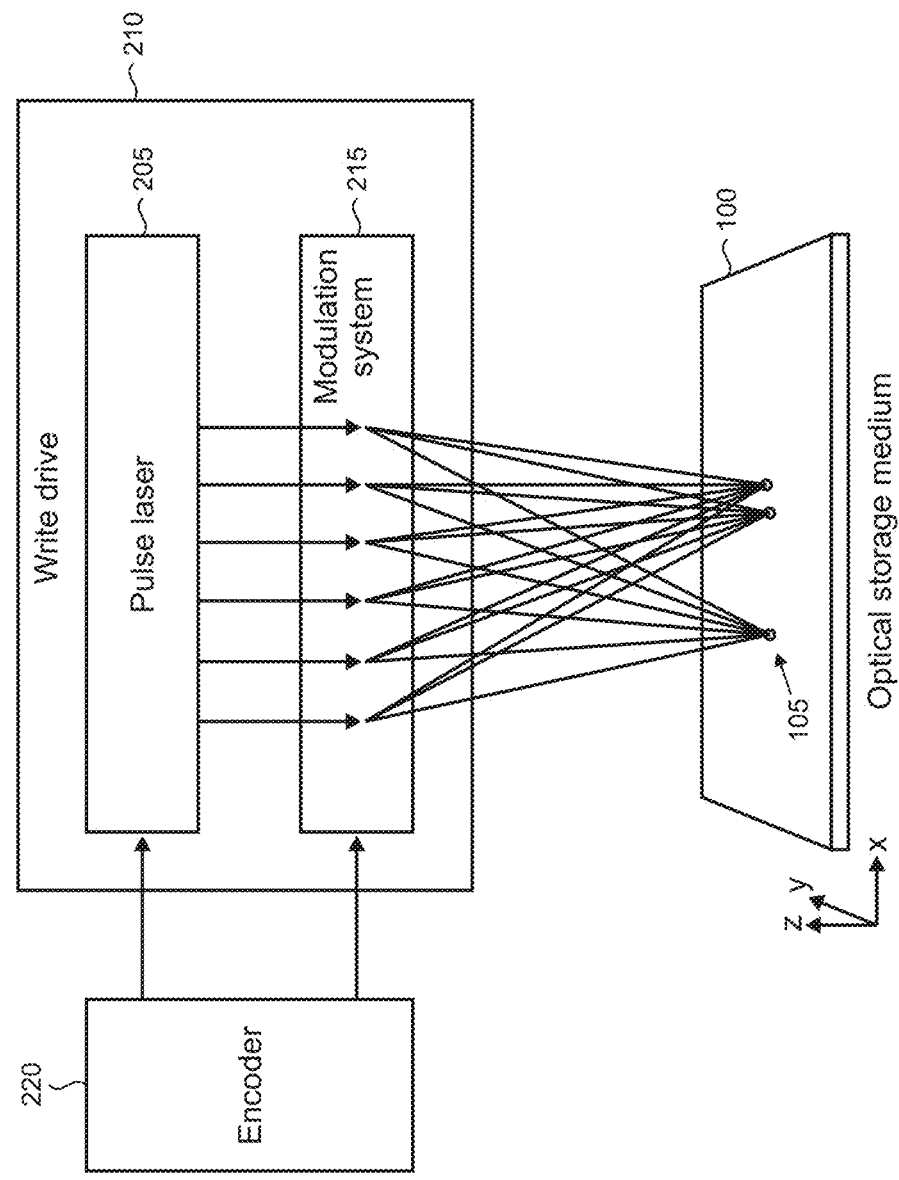
FIG. 2 shows an illustrative optical data write and read system in which an optical storage medium is movable relative to the write and read systems.

The permanent modifications change the physical structure of the glass to form the voxels 105. As shown in FIG. 2, they can be created using femtosecond-scale ($\sim 10^{-15}$ seconds) high power pulses from an ultrashort pulse laser 205 in an optical write drive 210. To create a voxel 105, pulses are focused at varying depths into the glass of the optical storage medium 100. A single voxel can typically encode multiple bits, for example, by modulating the polarization of the laser beam and/or the pulse energy during voxel creation using a modulation system 215 based on instructions from an encoder 220. The voxels extend in three dimensions within the volume provided by the optical storage medium. Voxels are written side-by-side by the write system in two-dimensional layered arrays across the xy plane, and many hundreds of layers along the z dimension of the optical storage medium 100 can typically be created.

The write and read systems for the optical storage medium 100 can be arranged independently using different underlying technologies. Reading voxels is generally prone to noise and errors. The reading light must propagate through many voxel layers before and after the layer containing a voxel of interest. For example, if the optical storage medium contains 200 layers of voxels, the reading light will propagate through 199 layers of voxels that distort the phase of the light (i.e., giving rise to scattering) and scramble the signal which makes signal measurement noisy.

Figure 3:
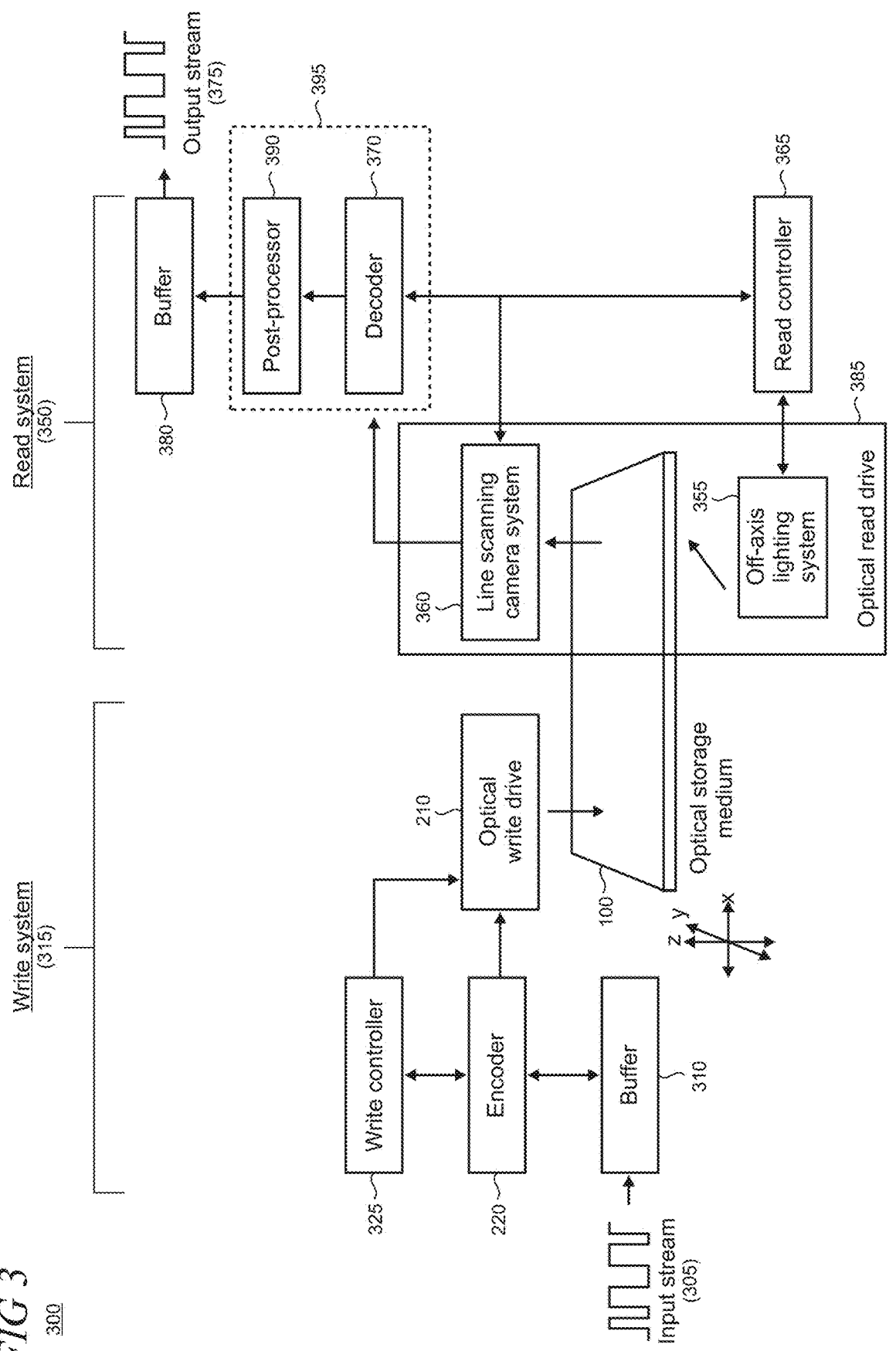
FIG. 3 shows an illustrative optical data write system.

FIG. 3 shows an illustrative optical data write and read architecture 300 that employs the present off-axis lighting to enhance the reading of data from an optical storage medium 100. Known techniques for microscopy and image post-processing using machine learning and artificial intelligence may be utilized for the data reading. Such image processing techniques are more robust using off-axis lighting which improves the SNR of the captured voxel images by reducing scattering from voxels in neighboring layers.

It is emphasized that while the constituent write and read systems are shown in the same drawing, they may be operated independently and non-simultaneously. For example, in typical mass storage scenarios, data is written to a plurality of optical storage media for archiving in a storage library. At some later time, one or more optical storage media are retrieved from storage and read using the processes described herein to access the stored data. Mass storage providers have the flexibility to separately support and provision the write, storage, and read processes. Providers can apply and scale resources as needed to meet variability of workloads across datacenters so that write, storage, and read capacities are efficiently utilized without excess capacity being stranded and/or insufficient capacity causing bottlenecks and delays.

An input data stream 305 to be written to the optical storage medium 100 is buffered in a buffer 310 in a write system 315. The encoder 220 parses the data in the buffer to provide suitable signals to the optical write drive 210 under control of a write controller 325. The optical storage medium is arranged on a movable stage (not shown) on the xy plane that facilitates movement in the relative positioning between the optical storage medium and the write component. Voxels are written at different locations in the xy plane of the volume while the write pulse laser is focused at varying depths to produce layers of voxels along the z axis.

In this illustrative embodiment, a read system 350 includes an off-axis lighting system 355 and a line scanning camera system 360 that are coupled to a read controller 365. As discussed in more detail in the text accompanying FIG. 11, the off-axis lighting system focuses an illumination beam on a layer of voxels of interest in the optical storage medium 100. The power of the illumination light used during reading cannot affect the physical structure of written voxels so the illumination cannot corrupt, overwrite, or erase any data stored, even if buggy, faulty, or under malicious control. The line scanning camera system 360 and off-axis lighting system 355 are typically incorporated into a read drive 385 in the read system 350.

The resultant interactions between the illumination beam and voxels are collected at the line scanning camera system as a sequence of images of the voxels. The images are output from the line scanning camera system to a decoder 370 in the read system 350 that writes a decoded output data stream 375 into a buffer 380. The read controller is also coupled to the decoder. The read controller is responsible for synchronizing the operations of the components under its control to ensure that voxels are appropriately illuminated and imaged during operations of the system 350 to read voxels in the optical storage medium 100.

A post-processor 390 is optionally utilized in the read system 350 in some cases to assist in determination of symbol values. The post-processor can implement a variety of different techniques, as appropriate, such as noise suppression using analog and/or digital circuits. The post-processor can also utilize software-based processing for post voxel detection decision making such as machine learning and artificial intelligence. The functions of the decoder and post-processor can be combined and implemented in a single device, processor, chip, etc., as indicated by the dotted rectangle 395.

Machine learning models can learn and account for any noise properties inherent in the end-to-end write and read processes, including inter-symbol interference between adjacent voxels in the glass, scattered light from neighboring layers during readout, variability between optical components, and other impairments. Machine learning can consider voxel decoding as a classification task: the post-processor 390 classifies every voxel into its most likely symbol value. For each set of voxels imaged, the post-processor takes the set of images as an input, and outputs a 2D array of probability distributions over the encoded symbols for all voxels in the area, one distribution for each voxel. These distributions may be subsequently used as inputs into error-correction processes to achieve a persistent and reliable optical storage medium.

Figures 4, 5:
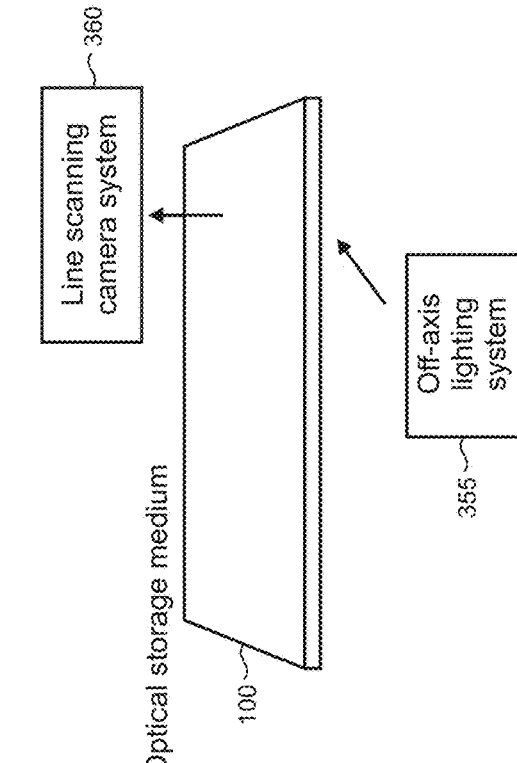
FIG. 4 shows an illustrative optical data read system using off-axis lighting.
FIG. 5 shows an illustrative optical data read system using off-axis lighting that is arranged to read from an optical storage medium having an alternative form factor.

The form factor of the optical storage medium 100 can vary to meet the requirements of a given implementation. FIG. 4 shows the off-axis lighting system 355 and line scanning camera system 360 components of the read system 350 when interoperating with the optical storage medium in a rectangular form factor. FIG. 5 shows an illustrative alternative circular form factor for the optical storage medium 100 that is rotated using a suitable actuator (not shown) in relation to the off-axis lighting system and line scanning camera system.

In an illustrative alternative embodiment shown in FIG. 6, the reading of voxels from the optical storage medium 100 can utilize beam-steering optics such as lenses, reflective optics, or scanning systems/devices. Different beam-steering optics 605 and 610 may be utilized with either or both the off-axis lighting system 355 and line scanning camera system 360, as illustratively shown. Use of the beam steering can provide additional flexibility to position the illumination from the off-axis lighting system and collect the light at the line scanning camera system 360 from various different locations within the volume of the optical storage medium. The beam-steering optics may further be configured for use with translational and/or rotational actuators of the read system 350 and/or optical storage medium to implement relative position changes which may facilitate the voxel reading processes.

FIG. 7 provides a side view of components of the line scanning camera system 360 which include a light-sensitive image sensor 705, a shutter 710 to control light exposure at the image sensor, and a microscopy objective 715. In some implementations, the controlling of light exposure to the image sensor is implemented by controlling the off-axis lighting system 355 (FIG. 3). For example, the system can be operated using pulsed or modulated light patterns in which various parameters such as amplitude, duty cycle, repetition rate, etc., are manipulated to control light exposure at the sensor. In some implementations, some aspects of the image sensor, such as sensor gain, are synchronized with the control of the illumination system to achieve the desired control of light exposure at the image sensor. In some implementations the employ a camera shutter, light exposure may be controlled using a combination of illumination modulation and shutter operations.

The line scanning camera system 360 typically includes other components (not shown) including, for example, image processing and control elements, memory, data storage, connectivity and communication interfaces, etc. The microscopy objective collects illumination light, indicated by line 720, from the off-axis lighting system that is scattered by voxels in the optical storage medium. The microscopy objective is configured with variable focal depth in typical implementations, although fixed-focus objectives are also usable in some implementations. In an illustrative example, the microscopy objective has a numeral aperture (NA) of 0.6 which provides high resolution and a relatively shallow depth of field. This provides for a spatial resolution of the read system of approximately 250 nm.

Figures 8, 9A, 9B:
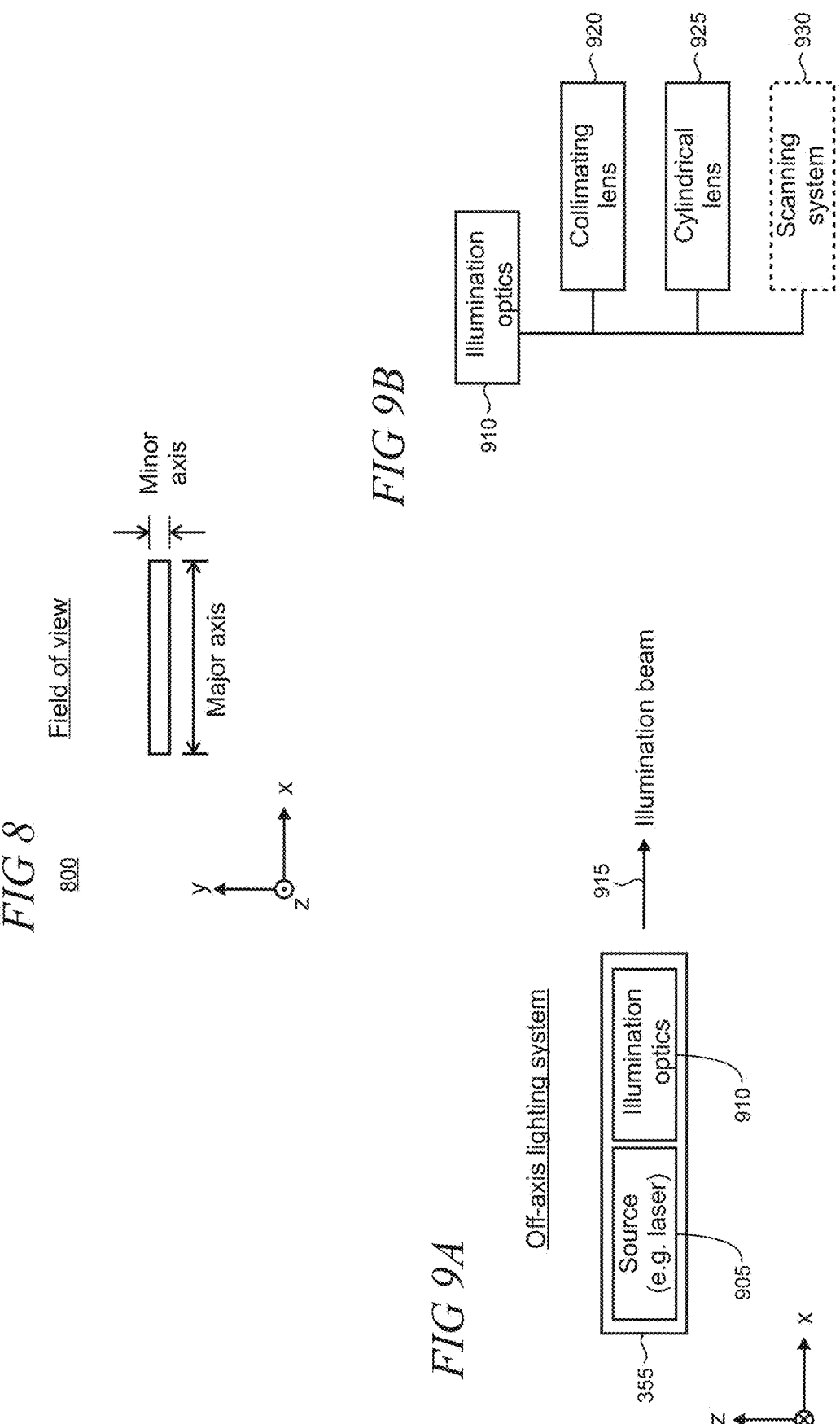
FIG. 8 shows a narrow field of view (FOV) of a line scanning camera system.
FIGS. 9A and 9B show components on an illustrative off-axis lighting system.

The line scanning camera system 360 is configured with a relatively narrow field of view (FOV) 800 as shown in FIG. 8 in a top view. The FOV is narrow because its major axis is greater in length than its minor axis. During read operations, the long axis of the FOV is oriented along an axis of a 1D array (i.e., a row) of pixels in an xy plane of a given voxel layer in the optical storage medium 100. As discussed in more detail below, the narrow FOV and short depth of field of the line scanning camera system is utilized in combination with an illumination beam having a narrow cross-sectional profile. The illumination beam is introduced into the optical storage medium and propagated along a specific path. The narrow camera FOV and narrow illumination beam profile are complementary to minimize collection of unwanted scattered light (i.e., noise) from surrounding voxels at the line scanning camera.

A variety of technologies are usable to implement the narrow FOV of the line scanning camera system. For example, returning to FIG. 7, the image sensor 705 is configured with a linear sensor array 725 that has a shape that approximately matches the FOV 800. The linear sensor array may comprise a single line of pixels in some implementations. Other sensor types such as time delay and integration (TDI) sensors with multiple rows of pixels may be alternatively utilized to increase sensitivity and/or image capture speed in other implementations. Irrespective of type, the image sensor configuration provides for a narrow FOV arranged along a single dimension. Specialized optics can also be utilized, singly or in combination with the linear sensor array, to implement the narrow FOV of the line scanning camera system. Such specialized optics can be incorporated into the microscopy objective 715 or be structured as one or more standalone components.

FIG. 9A shows that the off-axis lighting system 355 comprises an illumination source 905 and illumination optics 910. In an illustrative embodiment, the illumination source comprises a laser producing an illumination beam 915 having a wavelength of around 450 nm. Alternatively, the illumination source comprises a super luminescent semiconductor light source (e.g., a diode) that is typically broadband with high spatial coherence. When the source is implemented with a laser, it is typically configured as a Gaussian source such that the generated illumination beam has a 3D profile that is Gaussian. The laser is configured with an NA of 0.1 to produce a beam having a relatively small divergence angle with a beam waist in air (i.e., a refractive index of 1) of approximately 1.5 $\mu$m using the approximation $NA \approx \lambda_0/\pi w_0$ where $2w_0$ is the beam waist. As discussed above, in some implementations, the off-axis lighting system may be operated using pulsed or modulated light patterns. Such modulation may be implemented, for example, by controlling the illumination source (e.g., the laser or super luminescent diode). In some implementations, the illumination optics are configured for modulating the off-axis lighting system, singly, or in combination with illumination source modulation.

As shown in FIG. 9B, the illumination optics 910 comprise a collimating lens 920 and a cylindrical lens 925. The lenses are configured in a series arrangement such that illumination beam 915 propagates through the collimating lens followed by the cylindrical lens. The collimating lens generally transforms the illumination beam quality from the laser to maintain its Gaussian profile as it propagates. In the read system 350, the positioning of the collimating lens relative to the laser 905 can determine the beam waist location and/or size along its propagation path in the optical storage medium 100 (FIG. 1).

In some implementations, additional collimating lenses or other types of lenses can be utilized to control illumination beam shape, waist size and location, and convergence/divergence characteristics by adjusting the focal length of the collimating lens. In some implementations, either or both the collimating lens 920 and cylindrical lens 925 are variably position-able with respect to each other and/or the laser 905, or are otherwise configured to have adjustable or variable beam shaping and transformation capabilities. In some implementations, multiple collimating lenses may be used to provide collimation in two directions when shaping astigmatic illumination beams which may be generated, for example, when using a laser diode as an illumination source.

The cylindrical lens 925 shapes the illumination beam 915 by focusing light in a single dimension while leaving the orthogonal dimension unaffected. When the Gaussian beam passes through the cylindrical lens, the lens focuses or diverges light along a power direction which runs along the curved length of the lens. The non-power direction, orthogonal to the power direction, remains unchanged. Such asymmetric shaping results in an elliptical beam profile for the illumination beam after passing through the cylindrical lens. For laser diodes which produce an elliptical beam due to the rectangular shape of the diode's active region, the cylindrical lens can be used to further elongate the elliptical illumination beam in one axis along the power direction.

A scanning system 930 may be used as an alternative to the cylindrical lens as indicated by the dashed rectangle in FIG. 9B. Illustrative examples of the scanning system are discussed above. The collimated illumination beam is directed onto a mirror or other suitable component in the scanning system which rapidly moves (e.g., oscillates or rotates) to deflect the beam at high frequencies. As the mirror moves, it sweeps the laser beam across a surface or through space, creating a line of laser light. The motion of the mirror can be controlled to determine the size (e.g., length) of the line. In alternative embodiments, the illumination system comprises one or more point sources to generate multiple lines of illumination light within the optical storage medium using a suitable one of the scanning systems discussed above. One or more read systems may also be configured for imaging voxels illuminated by the multiple lines. For example, an individual read system may be used for each line of illumination light. In some cases, a suitably-configured scanning system directs light scattered by the voxels into a respective read system.

FIG. 10 shows the read system 350 using off-axis lighting as configured for use when reading voxels from the optical storage medium 100. As shown, the off-axis lighting and line scanning camera systems, 355 and 360, and the optical storage medium are configured with respective mechanical actuators 1005, 1010, and 1015 to enable relative motion among the components. When a read is performed, the optical storage medium 100 is mechanically loaded into the read drive in the read system 350 such that it is mounted and movable by the platter actuator 1015.

The type and extent of motion imparted by the actuators to the read system 360 and optical storage medium 100 can vary by implementation. For example, as shown, the actuators 1005, 1010, and 1015 have six degrees of freedom of motion (three translational motions and three rotational motions) that are enabled using various conventional systems and/or mechanisms (not shown). Fewer degrees of freedom may be utilized in some use scenarios. Generally, at least physical translation in two dimensions in the xy plane is provided to enable voxels to be read in a given layer of the optical storage medium. Imaging of the layers in the z direction may be handled optically in such cases. For example, individual voxel layers may be read by varying the focal depth of the microscopy objective 715. Alternatively, relative vertical movement in the z direction between the line scanning camera system and optical storage medium can be implemented. Combinations of optical techniques and physical motions along various translational and/or rotational axes may also be utilized as needed to meet particular requirements of a given implementation.

Figure 11:
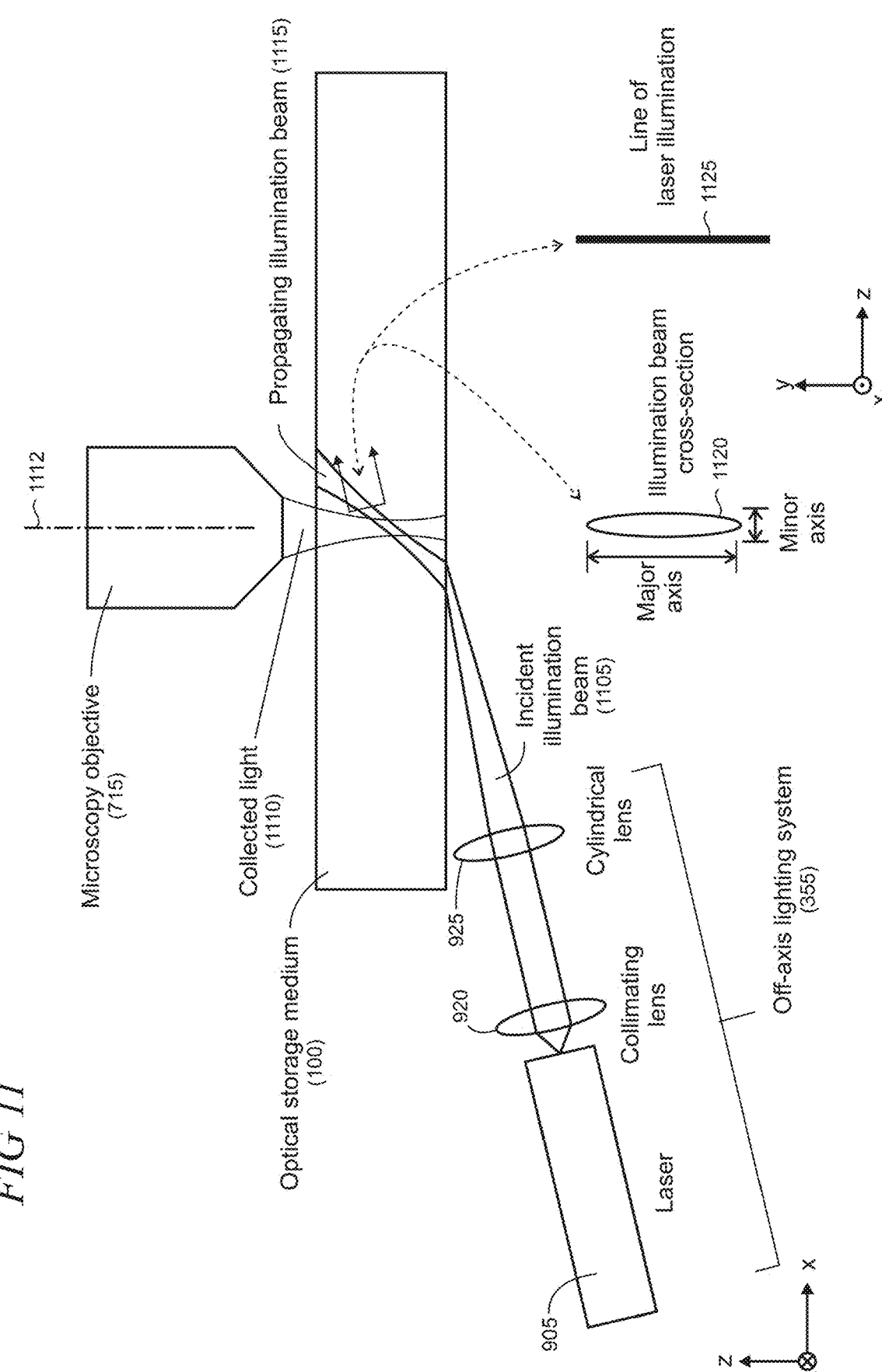
FIG. 11 shows an illustrative example of the relative positions of an illumination beam from an off-axis lighting system and light collected by a microscopy objective of a line scanning camera system.

FIG. 11 shows an illustrative example of the relative positions of an illumination beam 1105 from the off-axis lighting system 355 and light 1110 that is collected by the microscopy objective 715 of the line scanning camera system. As shown, the microscopy objective is positioned such that its optical axis 1112 is orthogonal to the top of the optical storage medium 100. In this illustrative example, the x axes for respective 1D voxel arrays at various depths in the optical storage medium are parallel to the top surface (as shown in the cross-sectional view in FIG. 1). The FOV of the line scanning camera system is thus aligned with the given 1D voxel array being imaged. It is noted that the placement of voxel layers in an optical storage medium can vary by implementation and layers are not necessarily parallel with the exterior surfaces of the medium in all implementations.

The off-axis lighting system is positioned relative to the optical storage medium 100 such the illumination light impinges as an input to the volume at an angle of approximately 75° (with respect to the normal projected from the bottom of the volume). In the case of the bulk substrate of the optical storage medium having a refractive index around 1.5, the incident illumination light is at least partially transmitted via refraction into the optical storage medium. The angle of refraction for the propagating illumination beam 1115, as determined by Snell's law, is about 40°. As noted above, the cylindrical lens 925 provides an elliptically-shaped profile having major and minor axes in cross-section for the propagating illumination beam, as indicated by reference numeral 1120 in the drawing. In alternative embodiments when a MEMS scanning mirror is utilized, a line of laser illumination is provided as indicated by reference numeral 1125.

Figure 12:
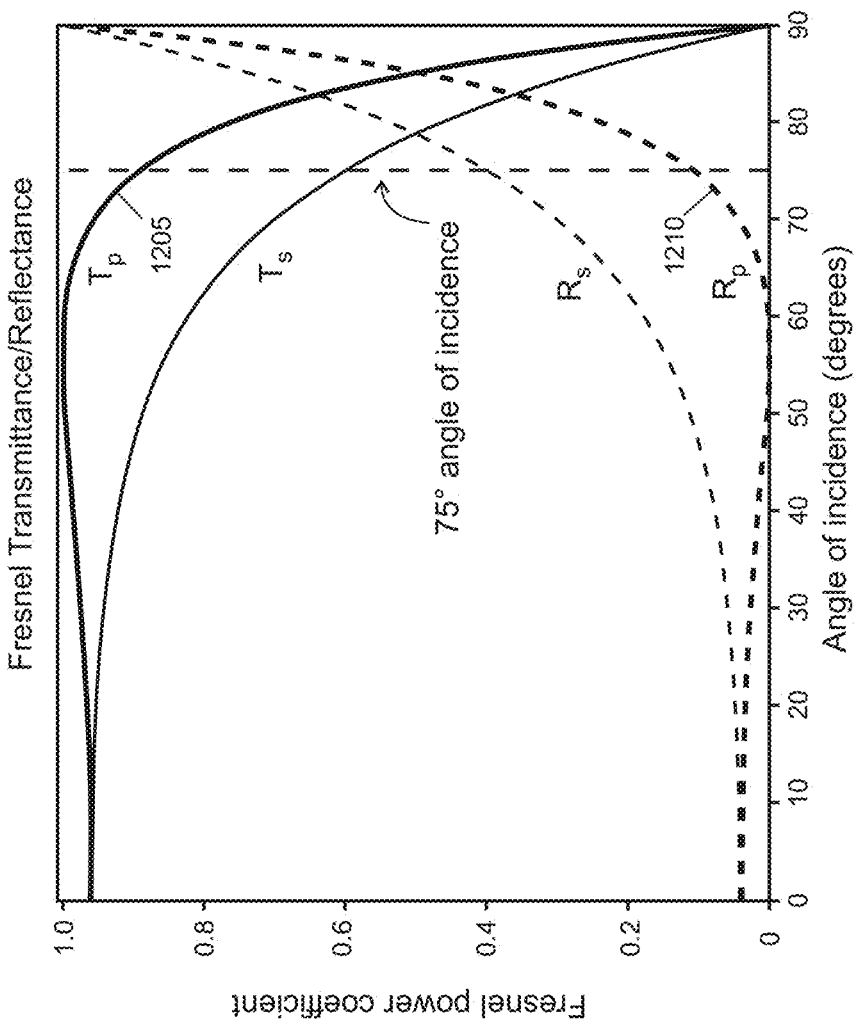
FIG. 12 is a graph showing Fresnel equation power coefficients for an illumination beam generated by an off-axis lighting system.

FIG. 12 is a graph 1200 showing Fresnel equation power coefficients for the illumination beam 1105 generated by the off-axis lighting system 355. Fresnel equations describe the transmission and reflection of the incident illumination beam at the air-to-glass interface at the optical storage medium 100. When the illumination light strikes the optical storage medium, both reflection and refraction of the light occur for each of the two components of polarization, s and p. For an angle of incidence of 75°, approximately 91% of the p-polarized light is refracted, as shown by curve $T_p$ (reference numeral 1205) and 9% is reflected as shown by curve Rp (reference numeral 1210).

FIG. 13 provides a graph 1300 showing Mie scattering observed using cross-polarization as a function of the angle of the illumination light propagating in the optical storage medium 100 for different voxel diameters. Mie scattering using cross polarization refer to the scattering of electromagnetic waves by spherical particles, observed through a specific optical setup. This technique combines Mie scattering theory with cross-polarization microscopy to study the optical properties of materials, particularly nanoscale structures. In cross-polarization, two polarizers are used perpendicular to each other, effectively eliminating direct light transmission. This setup allows for the detection of scattered light from the sample while filtering out directly reflected light. When applied to Mie scattering, this method can reveal important information about the optical modes and properties of the scattering particles.

FIG. 13 includes a family of curves 1305 in which each curve represents a different voxel diameter. The top curve 1310 in the family represents Mie scattering for a voxel diameter of approximately 200 nm (i.e., a larger voxel). The bottom curve 1315 represents Mie scattering for a voxel diameter of approximately 100 nm (i.e., a smaller voxel). The curves between the top and bottom curves represent Mie scattering for voxels in which the diameters decrease by 10 nm going down in the family of curves.

The Mie scattering curves indicate that the angular scattering distribution is only slightly dependent on voxel size, but that size strongly affects the scattering efficiency. At the 40° angle of propagation for illumination light in the optical storage medium 100, scattering efficiency is roughly half of the efficiency at 0°. Therefore, a 40° angle of propagation can be expected to provide sufficient scattered light from the interaction between the illumination beam and the voxels for effective detection and imaging.

FIG. 14 is an illustrative cross-sectional view 1400 of the optical storage medium 100 showing an intersection of the propagating illumination beam 1115 with a focal point 1405 for light 1410 collected by the line scanning camera system. The cross-section is a 40 μm thick portion of the optical storage medium in which the zero point is located at a layer of voxels 1415 midway through the cross-section.

As shown, adjacent voxel layers are spaced about 7 μm apart. However, this is an illustrative spacing by way of illustration and not by limitation. Typically, voxel layers are spaced apart in the range of 5 to 20 μm. For this spacing, the geometry utilized by the read system 350 for the off-axis lighting with the 40° propagation angle and beam waist of 1.5 μm enables the illumination beam to illuminate voxels in the layer 1415 near the focal point 1405 while illumination of other layers above and below layer 1415 falls outside the range for the collected light 1410. This arrangement significantly reduces the collection of light scattered by the non-imaged voxels as cross talk to thereby improve SNR for voxel reading.

It may be appreciated that the narrow FOV 800 of the line scanning camera system and elliptical profile 1120 of the illumination beam likewise reduce the collection of unwanted scattered light from adjacent rows of voxels in the same layer 1415, as shown in the enlarged view on the right side of the drawing. For example, rows of voxels in the xy plane may be viewed as a group of 1D voxel arrays. The 1D arrays can use similar spacing as the inter-layer spacing in the range of 5 to 20 μm. The width of the short axis of the FOV and the width of the short axis of the elliptical profile of the illumination beam may be specified based on the 1D voxel array spacing to minimize interference from light scattered by voxels in adjacent rows.

In the illustrative example shown in FIG. 14, the beam waist is substantially co-located with the focal point of the microscopy objective of the line scanning camera system at the coordinates x=0, z=0. However, in some implementations the illumination beam remains well collimated with minimal divergence to provide a relatively constant beam diameter throughout its propagation in the optical storage medium. In these implementations, voxel reading may be satisfactorily performed without requiring the beam waist and focal point to be co-located. In other implementations in which the illumination beam has a more pronounced waist, for example by use of a higher NA or focusing lenses, then a more optimal SNR may be achieved by co-locating the waist and focal point of the objective to collect light for voxel imaging with a minimal amount noise from unwanted light scattering from neighboring voxels.

FIG. 15 provides illustrative cross-sectional views 1505 and 1510 of a portion of an optical storage medium 100. The cross-sectional views 1505 and 1510 illustrate how voxels are illuminated and imaged at different spatial locations within the volume of the optical storage medium (only a single voxel layer is depicted to provide clarity). For a given layer of voxels 1515 in the z direction, relative translation in the xy plane between the optical storage medium 100 and the line scanning camera system 360 is implemented during the read process. The off-axis lighting system 355 can also be translated with the optical storage medium to enable voxels to be illuminated by the illumination beam 1115 as they are read by the line scanning camera system in the xy plane.

As noted above, to read from a different layer of voxels in the optical storage medium, the focal point of the microscopy objective 715 is set to different depths corresponding to the different positions along the z direction. In implementations using fixed-focus optics, one or more of the actuators 1005, 1010, and 1015 are configured to cause relative vertical translation between the line scanning camera system 360 and the optical storage medium 100.

In the cross-sectional view 1505 at some arbitrary time, $t_0$, the focal point 1520 of the microscopy objective in the line scanning camera scanning system 360 is located at a spatial location within the optical storage medium 100 that is increased in the z and x directions compared to the x=0, z=0 focal point 1405 shown in FIG. 14. In this example, the focal point is raised within the optical storage medium using the variable focus of the microscopy objective. The optical storage medium are configured for translation in the x direction, as indicated by arrow 1525, to enable reading of voxels in the layer 1515 by the line scanning camera system.

Cross-sectional view 1510 shows the optical storage medium 100 at some later time, $t_1$, in which the focal point 1530 is changed to a different location responsive to the optical storage medium being translated in the x direction. That is, the zero point on the x axis of the medium is changed with respect to line scanning camera 360 and the illumination beam 1115. In typical implementations, the line scanning camera system captures images of multiple voxels in a given row in the xy plane per frame. The motion speed of the optical storage medium is synchronized with the operations of the line scanning camera system (e.g., the camera shutter) to ensure proper registration between image capture events and medium position so that voxels are imaged at correct time intervals while maintaining suitable image quality.

FIG. 16 shows a comparison of a conventional read pattern 1605 for a portion of the optical storage medium 100 and a read pattern 1610 used by the present read system 350 with off-axis lighting. When used with conventional read systems, the voxels in the optical storage medium may be arranged in sectors in each of the layers. A sector is a two-dimensional array of voxels in the xy plane in a layer of the optical storage medium. A representative sector is indicated by reference numeral 1615. The arrays are commonly rectangular in shape, but other shapes for sectors and arrays can be used in some implementations. For example, arrays and/or sectors may be curved in implementations in which the optical storage medium has a circular form factor.

With the conventional read pattern 1605, the sectors are arranged in vertical tracks, as representatively indicated by reference numeral 1620. The number of tracks utilized in each optical storage medium can vary by implementation. The five sectors shown in track 1620 in the portion of the optical storage medium that is shown in the drawing are merely illustrative and not intended to be limiting. As previously noted, optical storage media can be configured to have hundreds of voxel layers in some cases.

Voxel images are captured sequentially up and down along the z axis of the volume of the optical storage medium. The conventional read pattern starts by locating a track of interest in the volume responsive to a read request (assumed to be track 1620 in this example) and reading the voxels in sector 1615 of the track. Reading then proceeds down in the negative z direction, reading voxels sector by sector, until the voxels in the bottom sector 1625 are read. The read pattern then proceeds up in the positive z direction for the adjacent track, and so on in a zigzag pattern, as required to read a sufficient amount of data from the optical storage medium responsive to the request. Typical workloads are dominated by small reads, so read requests can often be serviced by reading a single track in the optical storage medium.

With the read pattern 1610 for use with the read system 350 with off-axis lighting, the vertical track-based construct is replaced by a horizontal voxel organization and read scheme. Sectors may still be utilized, but they will generally be configured to be longer than those used in the conventional read pattern. Assuming that sector 1630 contains the data of interest responsive to a read request, the read pattern starts with reading voxels along sector 1630 and then proceeds downward in the negative z direction in a zigzag pattern through the sectors as required to service a given read request.

Due to the different voxel organization (horizontal arrays versus the conventional vertical tracks), the read system 350 with off-axis lighting provides optimal performance when the write pattern for the voxel data in the optical storage medium is optimized for horizontal reading. The horizontal read pattern typically can be expected to minimize the amount of vertical focusing needed when reading from different voxel layers for most read requests, which can save time. In addition, while the FOV of a frame is purposefully small, the line scanning camera in the read system can utilize a relatively high frame rate such that the overall data throughput is comparable to conventional microscopy-based image processing techniques. In addition, with the SNR improvements enabled by the off-axis lighting, read robustness and throughput is further enhanced compared to conventional read systems.

FIG. 17 is a flowchart of an illustrative method 1700 for optically reading data from an optical storage medium that may be implemented using a read system arranged using the present principles. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1705 includes providing an optical storage medium comprising a three-dimensional transparent volume having a plurality of voxel storage layers arranged in a vertical stack along a z axis, each layer defining a distinct voxel layer, wherein each voxel layer contains voxels arranged in a plurality of 1D arrays within an xy plane of the volume, the voxels encoding a plurality of corresponding symbols.

Block 1710 includes focusing a focal point of a microscopy objective of a line scanning camera on a predetermined layer of voxels within the optical storage medium, wherein the microscopy objective is aligned with the line scanning camera along an optical axis.

Block 1715 includes imparting relative motion between the line scanning camera and the optical storage medium such that the line scanning camera sequentially captures images of voxels in a selected 1D array of voxels in the predetermined layer.

Block 1720 includes generating an illumination beam at an illumination source to illuminate the voxels during the imaging.

Block 1725 includes directing the illumination beam to propagate along a path in the optical storage medium at an angle that is offset from the optical axis of the line scanning camera and microscopy objective.

Block 1730 includes receiving the captured voxel images at a decoder, the decoder being configured for decoding the imaged voxels to extract symbols or data.

FIG. 18 shows an illustrative architecture 1800 for a computing device, such as a server, capable of executing the various components described herein. The architecture 1800 illustrated in FIG. 18 includes one or more processors 1802 (e.g., central processing unit, dedicated AI (artificial intelligence) chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, a file system, and an operating system (OS). The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as an HDD (hard disk drive) or CD (compact disc) drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, and control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting semiconductor memory. The software also may transform the physical state of such components to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs (personal digital assistants), and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Various exemplary embodiments of the present reading of voxels in a optical storage medium using off-axis lighting are now presented by way of illustration and not as an exhaustive list of all embodiments. An example includes a method for optically reading data, the method comprising: providing an optical storage medium comprising a three-dimensional transparent volume having a plurality of voxel storage layers arranged in a vertical stack along a z axis, each layer defining a distinct voxel layer, wherein each voxel layer contains voxels arranged in a plurality of one-dimensional (1D) arrays within an xy plane of the volume, the voxels encoding a plurality of corresponding symbols; focusing a focal point of a microscopy objective of a line scanning camera on a predetermined layer of voxels within the optical storage medium, wherein the microscopy objective is aligned with the line scanning camera along an optical axis; imparting relative motion between the line scanning camera and the optical storage medium such that the line scanning camera sequentially captures images of voxels in a selected 1D array of voxels in the predetermined layer; generating an illumination beam at an illumination source to illuminate the voxels during the imaging; directing the illumination beam to propagate along a path in the optical storage medium at an angle that is offset from the optical axis of the line scanning camera and microscopy objective; and receiving the captured voxel images at a decoder, the decoder being configured for decoding the imaged voxels to extract symbols or data.

In another example, the illumination beam is arranged to illuminate a portion of the selected 1D array of voxels within a field of view (FOV) of the line scanning camera, the FOV having a major axis, and a minor axis that is narrow relative to the major axis, and in which the major axis is substantially aligned with the selected 1D array of voxels being imaged. In another example, the illumination beam has a cross-section with an elliptical shape having a major axis and a minor axis that is narrow relative to the major axis, and in which the major axis of the elliptical shape is substantially aligned with the selected 1D array of voxels being imaged. In another example, the method further includes controlling the line scanning camera and the relative motion between the line scanning camera and the optical storage medium to capture a plurality of voxel images in each frame of the sequential imaging. In another example, the method further includes adjusting the focal point of the microscopy objective to a second predetermined layer of voxels in the optical storage medium. In another example, the method further includes imparting relative motion between the line scanning camera and the optical storage medium such that the line scanning camera sequentially images voxels in a second selected 1D array of voxels in the second predetermined layer to capture a second set of voxel images.

A further example includes an optical read system configured for reading data encoded in voxels positioned in sectors within layers in an optical storage medium, comprising: a camera comprising a light-sensitive image sensor, the camera having an optical axis that is positioned relative to the optical storage medium such that a field of view (FOV) of the camera is capable of alignment with selected layers of the optical storage medium; a microscopy objective coupled to the camera having an adjustable depth of focus for controllably focusing on a selected layer of the optical storage medium, the microscopy objective being aligned along the optical axis of the camera; a source of an illumination beam that propagates in the optical storage medium to selectively illuminate voxels in the selected layer of the optical storage medium within the FOV of the camera; and illumination optics for shaping a cross-sectional profile of the illumination beam into an elliptical shape and positioning the illumination beam for entry at an oblique angle at a bottom surface of the optical storage medium.

In another example, the camera is a line scanning camera having an FOV characterized by a major axis and a minor axis, in which the minor axis is narrow relative to the major axis. In another example, the camera further includes a shutter for controlling light exposure to the image sensor to capture images of illuminated voxels in the selected layer of the optical storage medium within the FOV of the camera. In another example, the source comprises a laser providing an illumination beam with a wavelength of approximately 450 nm and the illumination optics provide a numeral aperture of 0.1 for the illumination beam such that a waist of the illumination beam is approximately 1.5 μm around an area of voxels being imaged. In another example, the optical read system further comprises a decoder for receiving image data from the camera and extracting respective symbol values from the imaged voxels. In another example, the optical read system further comprises a post-processor which applies machine learning for extracting respective symbol values from the imaged voxels. In another example, the optical read system further comprises one or more mechanical actuators for variably positioning or imparting relative motion to one or more of the optical storage medium, camera, microscopy objective, illumination beam source, or illumination optics. In another example, the optical storage medium has a refractive index of approximately 1.5, and an angle of propagation of the illumination beam in the optical storage medium is approximately 40° from a normal projection at the bottom surface of the optical storage medium. In another example, the oblique angle is approximately 75° from a normal projection at the bottom surface of the optical storage medium.

A further example includes an optical read drive for reading data from an optical storage medium containing a plurality of voxels arranged in layers, comprising: a line scanning camera comprising an image sensor and shutter, the line scanning camera having a field of view (FOV) a laser source configured to provide an illumination beam for illuminating voxels within the FOV of the line scanning camera in a selected layer of the optical storage medium; a microscopy objective coupled to the line scanning camera and being controllably focused on the selected layer of voxels in the optical storage medium, the microscopy objective and line scanning camera being aligned along a common optical axis that projects into the optical storage medium; and illumination optics coupled to the laser source for directing the illumination beam to propagate off-axis from the optical axis in the optical storage medium.

In another example, the optical read drive further comprises a motorized stage on which the optical storage medium is located, the motorized stage being configured for movably positioning voxels in the selected layer of the optical storage medium within the field of view of the line scanning camera to enable the line scanning camera to sequentially image voxels in the selected layer as the voxels are movably positioned. In another example, the optical read drive further comprises a controller coupled to the motorized stage, microscopy objective, and the line scanning camera, the controller being configured to synchronize movement of the optical storage medium on the motorized stage with operation of the line scanning camera shutter and microscopy objective. In another example, the illumination optics shape a cross-sectional profile of the illumination beam into an elliptical shape having major and minor axes and in which the FOV of the line scanning camera has major and minor axes, wherein the respective major and minor axes of the illumination beam and the FOV of the line scanning camera are substantially aligned. In another example, the microscopy objective is controllably focused using one of variable optical focus or relative motion imparted by one or more mechanical actuators between the microscopy objective and the optical storage medium.

Although the subject matter has been described in language specific to structural features and/or methodological acts, it is to be understood that the subject matter defined in the appended claims is not necessarily limited to the specific features, components, elements, and/or acts described above. Rather, the specific features, components, elements, and/or acts described above are disclosed as exemplary forms of implementing the claims, but are not necessarily the sole forms of implementing the claims.

What is claimed:

1. A method for optically reading data, the method comprising:

providing an optical storage medium comprising a three-dimensional transparent volume having a plurality of voxel storage layers arranged in a vertical stack along a z axis, each layer defining a distinct voxel layer, wherein each voxel storage layer contains voxels arranged in a plurality of one-dimensional (1D) arrays within an xy plane of the volume, the voxels encoding a plurality of corresponding symbols;

focusing a focal point of a microscopy objective of a line scanning camera on a predetermined layer of voxels of the plurality of voxel storage layers within the optical storage medium, wherein the microscopy objective is aligned with the line scanning camera along an optical axis;

imparting relative motion between the line scanning camera and the optical storage medium such that the line scanning camera sequentially captures images of voxels in a selected 1D array of voxels in the predetermined layer;

aligning a field of view (FOV) of the line scanning camera having a major axis, and a minor axis that is narrow relative to the major axis by aligning the major axis substantially with the selected 1D array of voxels being imaged;

generating an illumination beam at an illumination source to illuminate the voxels of the selected 1D array of voxels during the imaging;

directing the illumination beam to propagate along a path in the optical storage medium at an angle that is offset from the optical axis of the line scanning camera and the microscopy objective; and receiving the captured voxel images at a decoder, the decoder being configured for decoding the imaged voxels to extract symbols or data.

2. The method of claim 1 in which the illumination beam is arranged to illuminate a portion of the selected 1D array of voxels within a field of view (FOV) of the line scanning camera, the FOV having a major axis, and a minor axis that is narrow relative to the major axis, and in which the major axis is substantially aligned with the selected 1D array of voxels being imaged.

3. The method of claim 1 in which the illumination beam has a cross-section with an elliptical shape having the major axis and the minor axis.

4. The method of claim 1 further including controlling the line scanning camera and the relative motion between the line scanning camera and the optical storage medium to capture a plurality of voxel images in each frame of the sequential imaging.

5. The method of claim 1 further including adjusting the focal point of the microscopy objective to a second predetermined layer of voxels of the plurality of voxel storage layers in the optical storage medium.

6. The method of claim 5 further including imparting relative motion between the line scanning camera and the optical storage medium such that the line scanning camera sequentially images voxels in a second selected 1D array of voxels in the second predetermined layer to capture a second set of voxel images.

7. An optical read system configured for reading data encoded in voxels positioned in sectors within layers in an optical storage medium, comprising:

a camera comprising a light-sensitive image sensor, the camera having an optical axis that is positioned relative to the optical storage medium such that a field of view (FOV) of the camera is capable of alignment with the layers of the optical storage medium;

a microscopy objective coupled to the camera having an adjustable depth of focus for controllably focusing on a selected layer of the layers of the optical storage medium, the microscopy objective being aligned along the optical axis of the camera;

a source of an illumination beam that propagates in the optical storage medium to selectively illuminate voxels in the selected layer of the optical storage medium within the FOV of the camera; and illumination optics for shaping a cross-sectional profile of the illumination beam into an elliptical shape and positioning the illumination beam for entry at an oblique angle at a bottom surface of the optical storage medium.

8. The optical read system of claim 7 in which the camera is a line scanning camera having the FOV characterized by a major axis and a minor axis, in which the minor axis is narrow relative to the major axis.

9. The optical read system of claim 8 in which the camera further includes a shutter for controlling light exposure to the image sensor to capture images of illuminated voxels in the selected layer of the optical storage medium within the FOV of the camera.

10. The optical read system of claim 9 in which the source comprises a laser providing an illumination beam with a wavelength of approximately 450 nm and the illumination optics provide a numeral aperture of 0.1 for the illumination beam such that a waist of the illumination beam is approximately 1.5 μm around an area of voxels being imaged.

11. The optical read system of claim 9 further comprising a decoder for receiving image data from the camera and extracting respective symbol values from the imaged voxels.

12. The optical read system of claim 9 further comprising a post-processor which applies machine learning for extracting respective symbol values from the imaged voxels.

13. The optical read system of claim 7 further comprising one or more mechanical actuators for variably positioning or imparting relative motion to one or more of the optical storage medium, the camera, the microscopy objective, illumination beam source, or illumination optics.

14. The optical read system of claim 7 in which the optical storage medium has a refractive index of approximately 1.5, and an angle of propagation of the illumination beam in the optical storage medium is approximately 40° from a normal projection at the bottom surface of the optical storage medium.

15. The optical read system of claim 7 in which the oblique angle is approximately 75° from a normal projection at the bottom surface of the optical storage medium.

16. An optical read drive for reading data from an optical storage medium containing a plurality of voxels arranged in layers, comprising:

a line scanning camera comprising an image sensor and shutter, the line scanning camera having a field of view (FOV);

a laser source configured to provide an illumination beam for illuminating voxels within the FOV of the line scanning camera in a selected layer of the layers of the optical storage medium;

a microscopy objective coupled to the line scanning camera and being controllably focused on the selected layer of voxels in the optical storage medium, the microscopy objective and the line scanning camera being aligned along a common optical axis that projects into the optical storage medium;

illumination optics coupled to the laser source for directing the illumination beam to propagate off-axis from the optical axis in the optical storage medium;

a motorized stage on which the optical storage medium is located, and a controller coupled to the motorized stage, the microscopy objective, and the line scanning camera, the controller being configured to synchronize movement of the optical storage medium on the motorized stage with operation of the line scanning camera shutter and the microscopy objective.

17. The optical read drive of claim 16, wherein the motorized stage is configured for movably positioning voxels in the selected layer of the optical storage medium within the FOV of the line scanning camera to enable the line scanning camera to sequentially image selected voxels in the selected layer as the selected voxels are movably positioned.

18. The optical read drive of claim 16 in which the illumination optics shape a cross-sectional profile of the illumination beam into an elliptical shape having major and minor axes and in which the FOV of the line scanning camera has major and minor axes, wherein the respective major and minor axes of the illumination beam and the FOV of the line scanning camera are substantially aligned.

19. The optical read drive of claim 16 in which the microscopy objective is controllably focused using one of variable optical focus or relative motion imparted by one or more mechanical actuators between the microscopy objective and the optical storage medium.

* * * * *